(12) United States Patent
Briggs

(10) Patent No.: US 6,675,453 B2
(45) Date of Patent: Jan. 13, 2004

(54) METHOD OF REMANUFACTURING A TRANSMISSION ASSEMBLY

(75) Inventor: Roger L. Briggs, Lake Orion, MI (US)

(73) Assignee: General Motors Corporation, Detroit, MI (US)

( * ) Notice: Subject to any disclaimer, the term of this patent is extended or adjusted under 35 U.S.C. 154(b) by 73 days.

(21) Appl. No.: 10/166,806

(22) Filed: Jun. 11, 2002

(65) Prior Publication Data

US 2003/0226257 A1 Dec. 11, 2003

(51) Int. Cl.7 .................................................. B23P 6/00
(52) U.S. Cl. ................ 29/401.1; 29/402.04; 29/402.06; 29/402.08
(58) Field of Search ........................... 29/401.1, 402.04, 29/402.06, 402.08, 434, 557, 898.07

(56) References Cited

U.S. PATENT DOCUMENTS 3,747,196 A * 7/1973 Whittington ............. 29/898.01
4,617,711 A * 10/1986 McMinn ................... 29/402.08
4,930,590 A * 6/1990 Love et al. .................... 180/55

OTHER PUBLICATIONS

General Motors Powertrain Division, Hydra–matic 4L30–E Technician's Guide, pp. 1–101, 1992.

* cited by examiner

*Primary Examiner*—Gregory Vidovich
*Assistant Examiner*—Jermie E. Cozart
(74) *Attorney, Agent, or Firm*—Leslie C. Hodges

(57) ABSTRACT

A method is provided for remanufacturing a transmission assembly including an output shaft having an input end positioned adjacent an input sun gear. The method includes machining a pocket into the input end of the output shaft. A first roller needle bearing is positioned inside the pocket. The input sun gear is then replaced with a modified sun gear having a protruding center support hub configured to extend into the pocket and cooperate with the first roller needle bearing, thereby supporting the output shaft to prevent tilting of the output shaft to reduce wear.

6 Claims, 5 Drawing Sheets

METHOD OF REMANUFACTURING A TRANSMISSION ASSEMBLY

TECHNICAL FIELD

The present invention relates to a method of remanufacturing a transmission assembly by providing a pocket in the end of an output shaft and a sun gear having a protruding center support hub which extends into the pocket, thereby supporting the output shaft to prevent tilting of the output shaft to reduce wear.

BACKGROUND OF THE INVENTION

Planetary gear set failure is one of the most common failure modes for vehicle transmissions. A prior art transmission is shown in FIGS. 1 and 2. As shown, the transmission 10 includes a Ravigneaux gear set 12, which is a three-pinion design including a long pinion 14 and short pinion 16 (and a third pinion, not shown). The long pinion 14 is rotatable on a pinion pin 18, which is supported by the carrier member 20. The short pinion 16 is rotatably supported on the pinion pin 22, which is also supported by the carrier member 20.

An input sun gear 24, shown in FIG. 2, is positioned in the pocket 26 shown in FIG. 1, and includes threads which are engaged with the threads of the pinions 14, 16.

The output shaft (drive shaft) 26 includes an integral flange 28 having apertures 30, 32 which receive the pinion pin 22 and pinion 14, respectively. Accordingly, the pinion pins 18, 22 rotate about the centerline 34 with the output shaft 26, including the flange 28.

The output shaft 26 also includes an opening 36 which receives a pressed in pilot pin 38.

As shown in FIG. 2, the output shaft 26 is supported on a case bushing 39, and a reaction sun gear 40 is positioned around the output shaft 26 and driven by the long pinion 14. The reaction sun gear 40 is supported within the reaction sun gear drum 42.

Lubricating fluid 44 is distributed along the centerline of the sun gear 24 and output shaft 26. The lubricating fluid 44 follows a leakage path 46 to lubricate bearings in the assembly.

Accordingly, in this configuration, the three pinions (only two shown) of the Ravigneaux gear set 12 are primarily responsible for keeping the output shaft 26 piloted with the input sun gear 24. However, this structure may result in uneven loading and substantial wear on the pinions because the output shaft and input sun gear may tilt. This tilting would also wear the bushings on the input sun gear and output shaft, which may cause damage to these components, as well as damage to the governor bore. Also, the pilot pin may wear and also wear away the interior of the input sun gear 24.

Accordingly, it is desirable to provide a method of remanufacturing a heavy-duty transmission assembly as described above in an inexpensive and effective manner.

SUMMARY OF THE INVENTION

The present invention provides a method of remanufacturing a transmission assembly to stabilize the output shaft wherein a pocket is machined into the input end of the output shaft, and a modified sun gear is provided with a protruding center support hub which extends into the pocket such that the input sun gear is positively piloted to the output shaft by the protruding center support hub, thereby preventing tilting of the output shaft and reducing wear.

More specifically, the invention provides a method of remanufacturing a transmission assembly including an output shaft having an input end positioned adjacent an input sun gear. The method includes machining a pocket into the input end of the output shaft and positioning a first roller needle bearing inside the pocket. The input sun gear is replaced with a modified sun gear having a protruding center support hub configured to extend into the pocket and cooperate with the first roller needle bearing, thereby supporting the output shaft to prevent tilting of the output shaft to reduce wear.

The method may also include the machining of a stepped portion off the O.D. surface of the output shaft near the input end, and positioning a second roller needle bearing between the machined O.D. surface of the output shaft and an I.D. surface of a reaction sun gear. The method may also include enlarging the I.D. surface of the reaction sun gear prior to the step of positioning the second roller needle bearing between the machined O.D. surface and the I.D. surface of the reaction sun gear.

This method may be useful in remanufacturing any transmission in which an output shaft is not sufficiently piloted with respect to an input member, such as an input shaft or an input sun gear.

A significant benefit of the invention is that the reduced tolerances on the various assembly components, as a result of improved piloting of the input sun gear and output shaft, may result in increased fluid pressure on the inside of the sun gear member and output shaft, thereby enabling lubrication fluid to be sprayed toward components to be lubricated as a result of the pressurization of the lubrication system from the reduced tolerances.

The above objects, aspects, features and advantages and other objects, aspects, features and advantages of the present invention are readily apparent from the following detailed description of the best mode for carrying out the invention when taken in connection with the accompanying drawings.

DESCRIPTION OF THE PREFERRED EMBODIMENT

Figure 1:
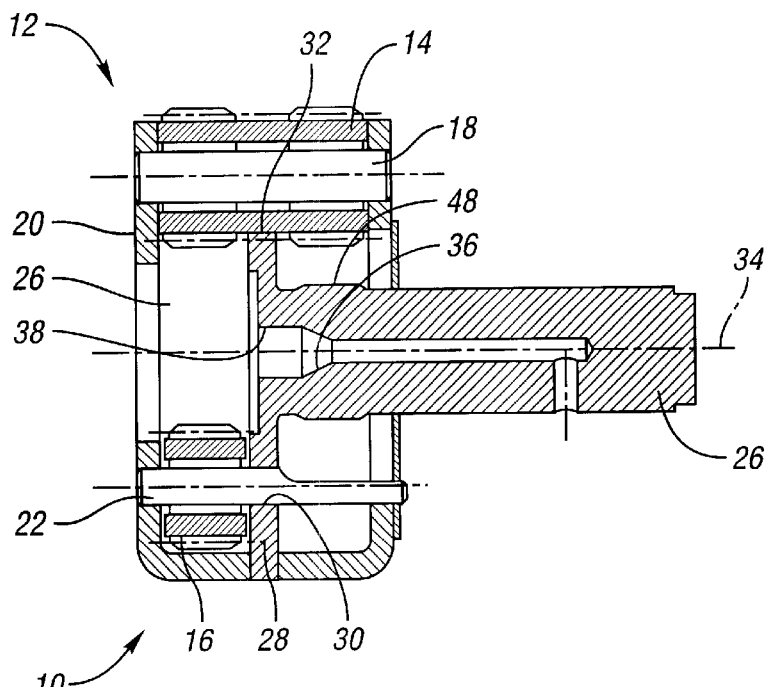
FIG. 1 shows a vertical cross-sectional view of a prior art planetary gear set and output shaft.
Figure 2:
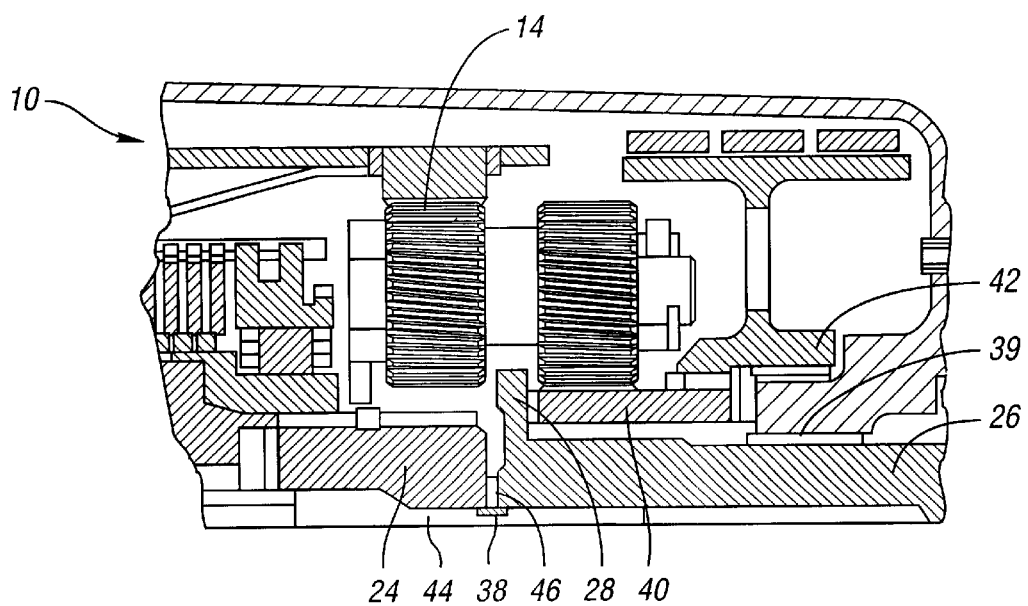
FIG. 2 shows a longitudinal cross-sectional view of the prior art planetary gear set and output shaft of FIG. 1 in a transmission assembly.
Figure 3:
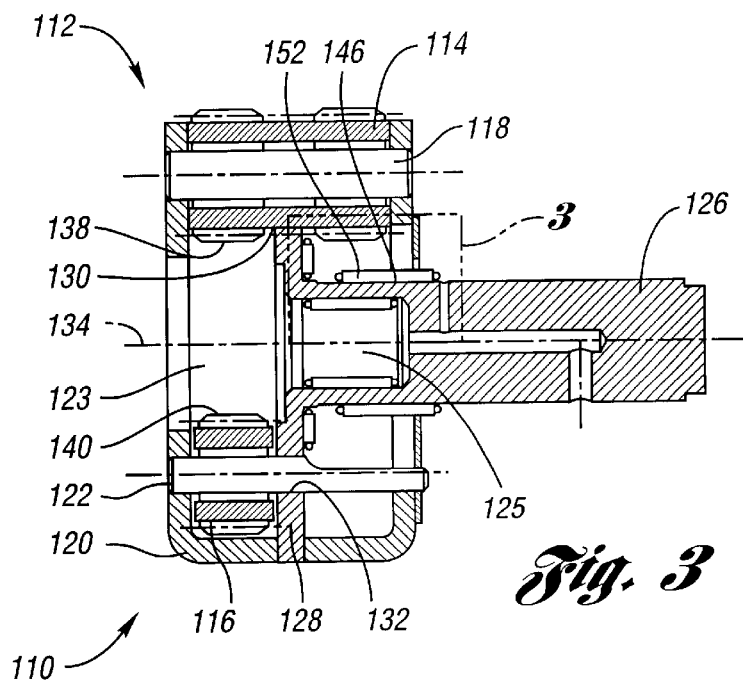
FIG. 3 shows a vertical cross-sectional view of a planetary gear set and output shaft in accordance with the present invention.
Figure 4:
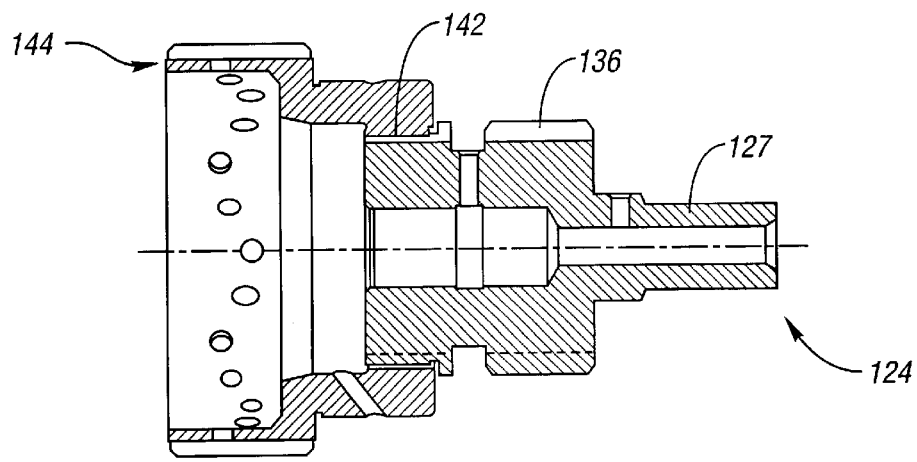
FIG. 4 shows a cross-sectional view of a clutch hub and input sun gear in accordance with the present invention.

FIG. 3 shows a vertical cross-sectional view of a modified transmission assembly 110 in accordance with the present invention. The transmission assembly 110 includes a Ravigneaux gear set 112, with a long opinion 114 and short pinion 116, which are supported with respect to the carrier member 120 on the pinion pins 118, 122, respectively. The carrier member 120 forms a pocket 123 to receive the input sun gear 124, which is shown in FIG. 4. As shown in FIG. 3, the output shaft 126 has been machined out, in comparison to the structure shown in FIG. 1, to form the enlarged pocket 125 to receive the protruding center support hub 127 of the input sun gear 124.

Figure 3A:
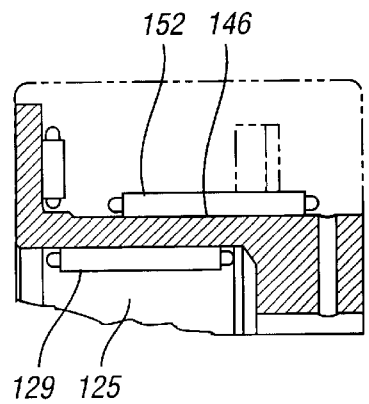
FIG. 3a shows an enlarged partial-sectional view taken from FIG. 3.

As shown in FIG. 3a, a first roller needle bearing 129 is positioned within the pocket 125 to cooperate with the protruding center support hub 127. Accordingly, the input sun gear 124 is positively located or piloted with respect to the output shaft 126.

As further shown in FIG. 3, the output shaft 126 includes the radially-extending flange 128. The flange 128 includes apertures 130, 132 to receive the pinion 114 and pinion pin 122, respectively, therein. The output shaft 126 and input sun gear 124 (shown in FIG. 4) rotate about the centerline 134. Accordingly, the teeth 136 of the input sun gear 124, shown in FIG. 4, engage the teeth 140 of the short pinion 116, which is in constant mesh with the teeth 138 of the long pinion 114 shown in FIG. 3. The movement of the pinions 114, 116 about the centerline 134 causes corresponding movement of the pinion pins 118, 122 and the flange 128, thereby rotating the output shaft 126, as illustrated in FIG. 3.

As further shown in FIG. 4, the input sun gear 124 is splined at the spline interface 142 to the third clutch hub 144.

Figure 5:
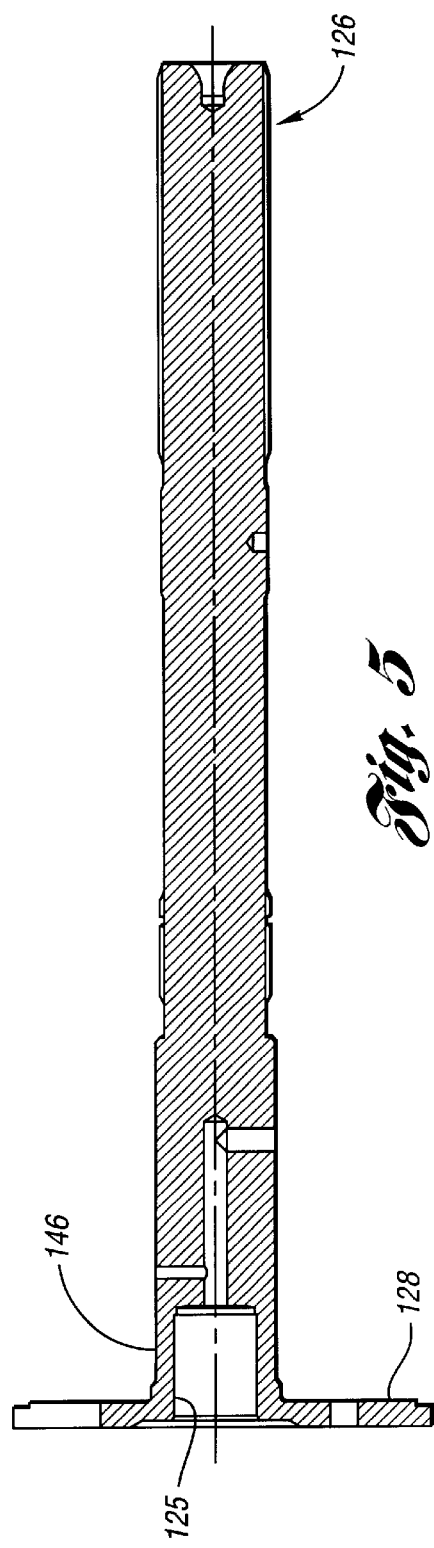
FIG. 5 shows a longitudinal cross-sectional view of an output shaft in accordance with the present invention.
Figure 7:
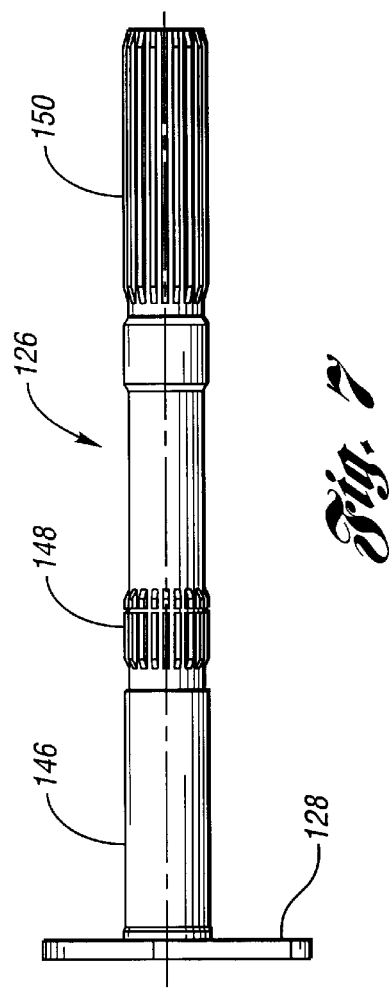
FIG. 7 shows a side view of the output shaft of FIG. 5.
Figure 6:
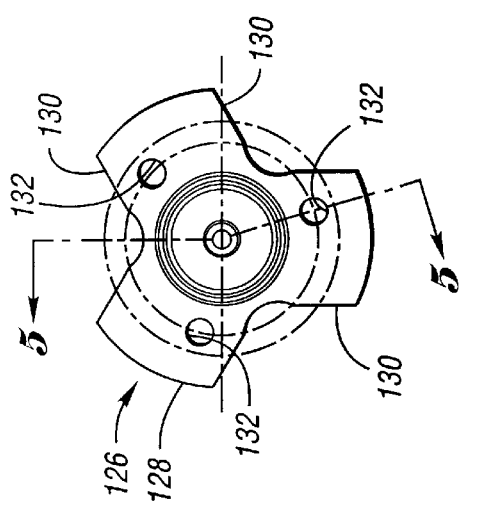
FIG. 6 shows an end view of the output shaft of FIG. 5.

The output shaft 126 is more clearly shown in FIGS. 5–7. As shown in FIG. 5, the O.D. surface 146 has been machined down to remove the stepped portion 48 of the output shaft 26 shown in FIG. 1. In FIGS. 5 and 6, the flange 128 and apertures 130, 132 are more clearly illustrated. The enlarged pocket 125 is also clearly illustrated. FIG. 7 also shows the splines 148, 150 on the output shaft 126.

Figure 8:
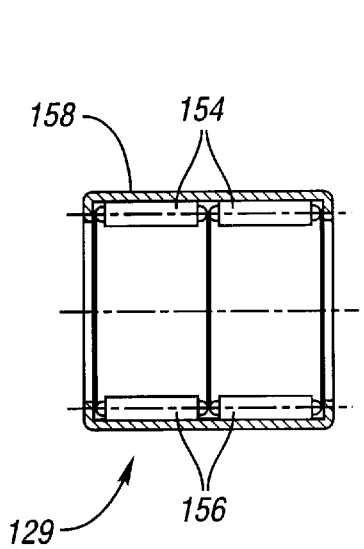
FIG. 8 shows a vertical cross-sectional view of an inner roller bearing for the output shaft of FIG. 5.
Figure 9:
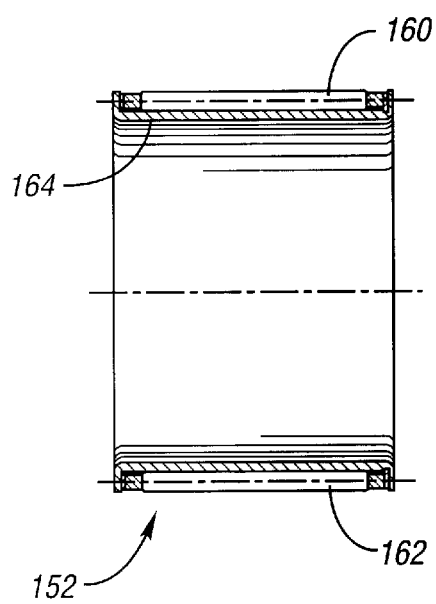
FIG. 9 shows a vertical cross-sectional view of an outer roller bearing for the output shaft of FIG. 5.

FIG. 8 shows a vertical cross-sectional view of the first roller needle bearing 129, which is also illustrated in FIG. 3a. FIG. 9 shows a vertical cross-sectional view of the second roller needle bearing 152, which is positioned on the O.D. surface 146 of the output shaft 126, as illustrated in FIGS. 3 and 3a. The first roller needle bearing 129 includes rollers 154, 156 supported on a bearing housing 158. As shown in FIG. 9, the second roller needle bearing 152 includes rollers 160, 162, which are supported on a bearing housing 164.

Figure 10:
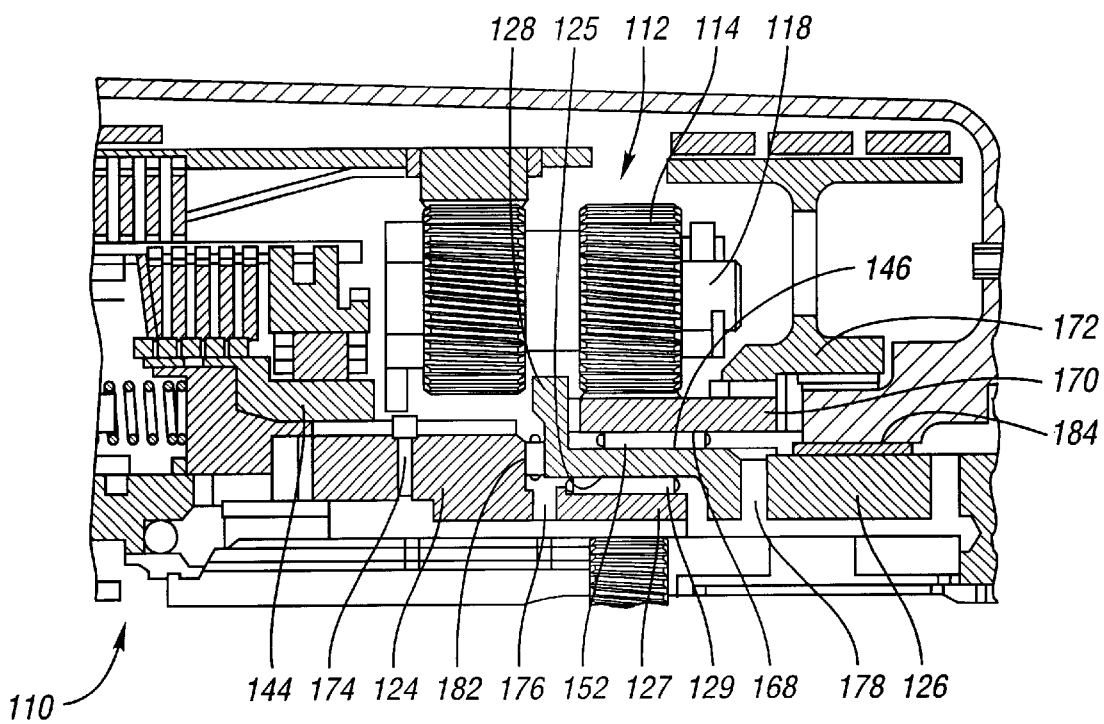
FIG. 10 shows a partial longitudinal cross-sectional view of a transmission assembly in accordance with the present invention.

FIG. 10 shows a longitudinal cross-sectional view of a modified transmission assembly 110 in accordance with the invention. FIG. 10 shows the modified sun gear 124 with the protruding center support hub 127 and its cooperation with the first roller needle bearing 129 within the pocket 125 of the output shaft 126. FIG. 10 also illustrates the second roller needle bearing 152 positioned on the O.D. surface 146 of the output shaft 126. The I.D. surface 168 of the reaction sun gear 170 has been enlarged with respect to the prior art (FIG. 1) to receive the second roller needle bearing 152. The reaction sun gear 170 is supported by the reaction sun gear drum 172.

Accordingly, new lube passages 174, 176, 178 are provided to carry the lubricating fluid to the appropriate locations. The lubricating passage 174 directs fluid to the top of the pinion 114. The lubricating passage 176 directs fluid to the axial bearing 182. The lubricating passage 178 directs fluid toward the second roller needle bearing 152 and case bushing 184. The configuration described above provides significantly narrower tolerances than the prior art. Accordingly, a pressurized fluid system is created and the lubricant may be sprayed to the desired locations, rather than simply leaking toward the desired locations. This may significantly improve performance and longevity of the system.

Figure 11:
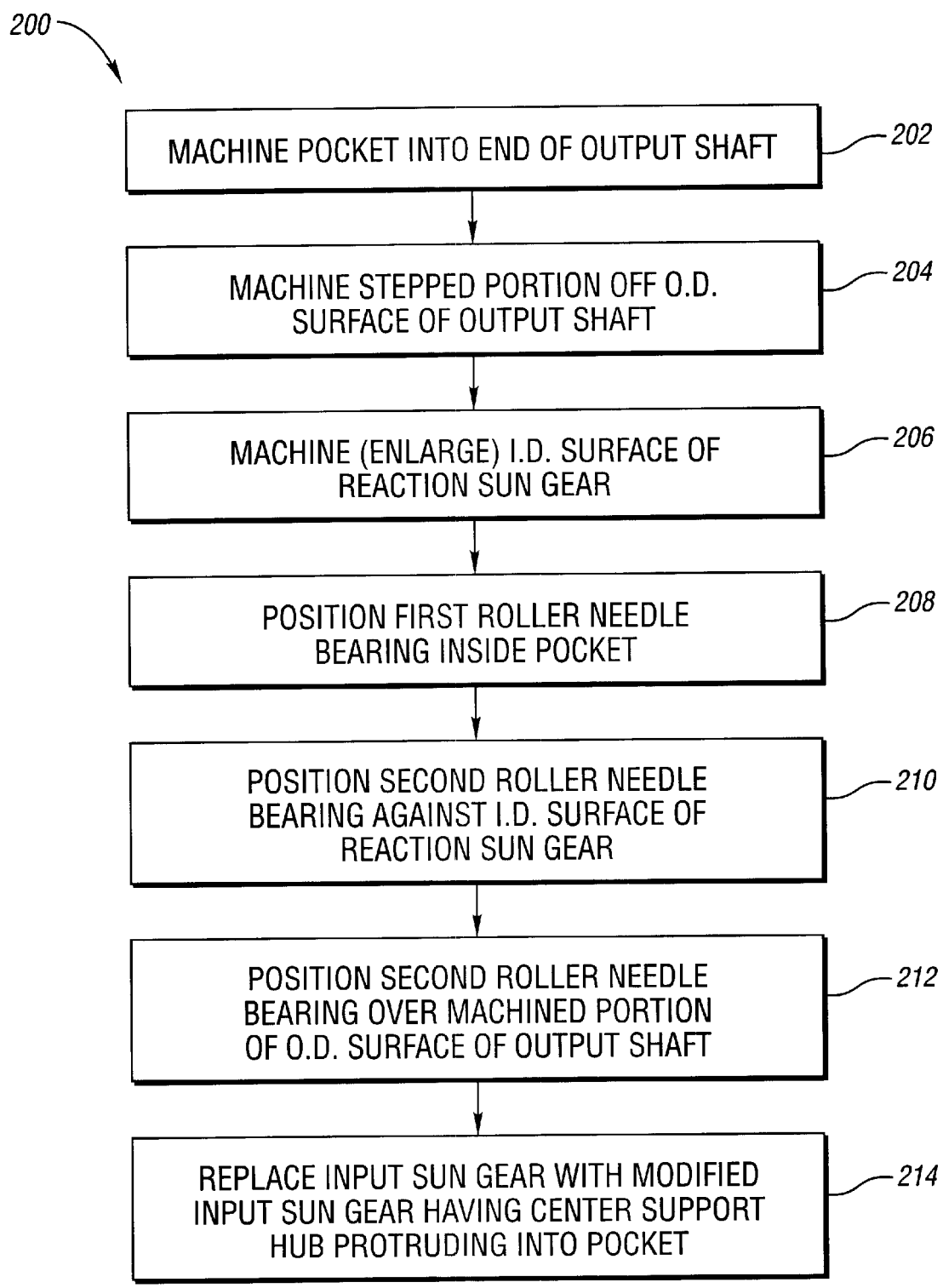
FIG. 11 shows a flow chart of a remanufacturing method in accordance with the present invention.

A remanufacturing method 200 in accordance with the present invention is illustrated in FIG. 11. At step 202, the enlarged pocket 125 is machined into the input end of the output shaft 126. At step 204, the stepped portion 48 of the O.D. surface of the input shaft 26 (shown in FIG. 1) is machined off the output shaft. At step 206, the I.D. surface 168 of the reaction sun gear 170 is machined (enlarged). At step 208, the first roller needle bearing 129 is positioned inside the pocket 125. At step 210, the second roller needle bearing 152 is positioned against the I.D. surface 168 of the reaction sun gear 170. At step 212, the second roller needle bearing 152 is positioned against the machined portion of the O.D. surface 146 of the output shaft 126. At step 214, the prior art input sun gear is replaced with the modified input sun gear 124 having the center support hub 127 protruding into the pocket 125 for cooperation with the first roller needle bearing 129.

The present invention may be useful for any transmission assembly in which an input member is not positively piloted with respect to an output shaft.

While the best mode for carrying out the invention has been described in detail, those familiar with the art to which this invention relates will recognize various alternative designs and embodiments for practicing the invention within the scope of the appended claims.

What is claimed is:

1. A method of remanufacturing a transmission assembly including an output shaft having an input end positioned adjacent an input sun gear, the method comprising:

machining a pocket into the input end of the output shaft;

positioning a first roller needle bearing inside the pocket; and replacing the input sun gear with a modified sun gear having a protruding center support hub configured to extend into the pocket and cooperate with the first roller needle bearing, thereby supporting the output shaft to prevent tilting of the output shaft to reduce wear.

2. The method of claim 1, wherein the an outer diameter surface of the output shaft includes a stepped portion near the input end, the method further comprising machining the stepped portion off the an outer diameter surface, and positioning a second roller needle bearing between the machined an outer diameter surface and the an inner diameter surface of a reaction sun gear.

3. The method of claim 2, further comprising enlarging said inner diameter surface of the reaction sun gear prior to said step of positioning the second roller needle bearing between the machined outer diameter surface and the inner diameter surface of the reaction sun gear.

4. A method of remanufacturing a transmission assembly including an output shaft having an input end positioned adjacent an input sun gear, the method comprising:

machining a pocket into the input end of the output shaft;

positioning a first roller needle bearing inside the pocket;

replacing the input sun gear with a modified sun gear having a protruding center support hub configured to extend into the pocket and cooperate with the first roller needle bearing, thereby supporting the output shaft to prevent tilting of the output shaft to reduce wear; and positioning a second roller needle bearing between an outer diameter surface of the output shaft and an inner diameter surface of a reaction sun gear circumscribing the output shaft.

5. The method of claim 4, further comprising enlarging said inner diameter surface of the reaction sun gear prior to said step of positioning the second roller needle bearing between the outer diameter surface and the inner diameter surface of the reaction sun gear.

6. A method of remanufacturing a transmission assembly including an output shaft having an input end positioned adjacent an input sun gear, wherein the outer diameter surface of the output shaft includes a stepped portion near the input end, and the transmission assembly further includes a reaction sun gear circumscribing the output shaft, the method comprising:

machining a pocket into the input end of the output shaft;

machining the stepped portion off the outer diameter surface of the output shaft;

positioning a first roller needle bearing inside the pocket;

replacing the input sun gear with a modified input sun gear having a protruding center support hub configured to extend into the pocket and cooperate with the first roller needle bearing, thereby supporting the output shaft to prevent tilting of the output shaft to reduce wear;

enlarging the inner diameter surface of the reaction sun gear by machining; and positioning a second roller needle bearing between the machined outer diameter surface of the output shaft and the machined inner diameter surface of the reaction sun gear.

* * * * *